(12) United States Patent
Koshita et al.

(10) Patent No.: US 10,793,694 B2
(45) Date of Patent: Oct. 6, 2020

(54) EXPANDED THERMOPLASTIC POLYURETHANE PARTICLES AND EXPANDED THERMOPLASTIC POLYURETHANE PARTICLE MOLDED ARTICLE

(71) Applicant: JSP Corporation, Tokyo (JP)

(72) Inventors: Nobumasa Koshita, Yokkaichi (JP); Koki Nishijima, Tokyo (JP); Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 242 days.

(21) Appl. No.: 15/578,608

(22) PCT Filed: May 25, 2016

(86) PCT No.: PCT/JP2016/065471
§ 371 (c)(1),
(2) Date: Nov. 30, 2017

(87) PCT Pub. No.: WO2016/194737
PCT Pub. Date: Dec. 8, 2016

(65) Prior Publication Data
US 2018/0155518 A1 Jun. 7, 2018

(30) Foreign Application Priority Data
Jun. 1, 2015 (JP) .................... 2015-111617

(51) Int. Cl.
| C08J 9/18 | (2006.01) |
| C08J 9/228 | (2006.01) |
| B29C 44/34 | (2006.01) |
| C08J 9/232 | (2006.01) |
| B29C 44/44 | (2006.01) |
| C08L 75/04 | (2006.01) |
| B29K 75/00 | (2006.01) |
| B29K 105/04 | (2006.01) |
| B29K 101/12 | (2006.01) |

(52) U.S. Cl.
CPC .......... C08J 9/18 (2013.01); B29C 44/3461 (2013.01); B29C 44/445 (2013.01); C08J 9/228 (2013.01); C08J 9/232 (2013.01); C08L 75/04 (2013.01); B29K 2075/00 (2013.01); B29K 2101/12 (2013.01); B29K 2105/046 (2013.01); B29K 2995/007 (2013.01); B29K 2995/0063 (2013.01); C08J 2205/052 (2013.01); C08J 2300/22 (2013.01); C08J 2375/04 (2013.01)

(58) Field of Classification Search
CPC ............. B29C 44/3461; B29C 44/445; B29K 2075/00; B29K 2101/12; B29K 2105/046; B29K 2995/0063; B29K 2995/007; C08J 9/18; C08J 9/228; C08J 9/232; C08J 2205/052; C08J 2300/22; C08J 2375/04; C08L 75/04
See application file for complete search history.

(56) References Cited

U.S. PATENT DOCUMENTS

| 2004/0054023 | A1 | 3/2004 | Kaneda et al. | |
| 2010/0222442 | A1 | 9/2010 | Prissok et al. | |
| 2012/0329892 | A1 | 12/2012 | Prissok et al. | |
| 2015/0196809 | A1* | 7/2015 | Sullivan | A63B 37/0058 473/376 |
| 2016/0297943 | A1 | 10/2016 | Daschlein et al. | |
| 2017/0051121 | A1* | 2/2017 | Prissok | C08J 9/228 |
| 2017/0218154 | A1* | 8/2017 | Huang | C08J 9/18 |

FOREIGN PATENT DOCUMENTS

| CN | 104194030 A | 12/2014 |
| CN | 104231592 A | 12/2014 |
| JP | H08-113664 A | 5/1996 |
| JP | 2002-371154 A | 12/2002 |
| JP | 2014-062213 A | 4/2014 |
| WO | 2015/052265 A1 | 4/2015 |

OTHER PUBLICATIONS

International Search Report for PCT/JP2016/065471 dated Aug. 16, 2016; English translation submitted herewith (5 pages).
Office Action dated Jun. 22, 2018, in the corresponding Chinese patent application.
Extended European Search Report issued in corresponding European Application No. 16803172.2 dated Nov. 16, 2018 (7 pages).

* cited by examiner

*Primary Examiner* — John M Cooney
(74) *Attorney, Agent, or Firm* — Fitch, Even, Tabin & Flannery LLP

(57) ABSTRACT

Provided are expanded beads capable of providing an expanded thermoplastic polyurethane beads molded article which is excellent in physical properties, such as compression characteristics, repulsion elasticity, etc., and an expanded thermoplastic polyurethane beads molded article. Expanded beads of thermoplastic polyurethane, wherein a Shore A hardness of the thermoplastic polyurethane is 85 or more; an average cell diameter of the expanded beads is 50 to 300 μm; and a closed cell ratio when bisecting the expanded thermoplastic polyurethane bead is 60% or more; and an expanded thermoplastic polyurethane beads molded article obtained through in-mold molding of the same are disclosed.

9 Claims, 4 Drawing Sheets

EXPANDED THERMOPLASTIC POLYURETHANE PARTICLES AND EXPANDED THERMOPLASTIC POLYURETHANE PARTICLE MOLDED ARTICLE

CROSS-REFERENCE TO RELATED APPLICATIONS

This application is a U.S. national phase application filed under 35 U.S.C. § 371 of International Application PCT/JP2016/065471, filed on May 25, 2016, designating the United States, which claims priority from Japanese Application Number 2015-111617, filed Jun. 1, 2015.

FIELD OF THE INVENTION

The present invention relates to expanded thermoplastic polyurethane beads and an expanded thermoplastic polyurethane beads molded article. The thermoplastic polyurethane is hereinafter sometimes referred to as "TPU".

BACKGROUND OF THE INVENTION

TPU is known as one kind of thermoplastic elastomers. TPU has excellent wear resistance, cold resistance, and repulsion elasticity because TPU exhibits characteristics close to those of vulcanized rubbers. In addition, TPU is high in mechanical strength, and TPU is positioned as an engineering elastomer and used for a variety of applications, such as cushioning materials, vibration-damping materials, sports goods, automobile members, etc.

An expanded molded article obtained through expansion of this TPU is able to contemplate lightness in weight or softening, while keeping excellent characteristics, such as wear resistance, repulsion elasticity, etc., and hence, application development of sports goods, automobile members, and so on is expected in the future. The expanded molded article of TPU can be produced by an extrusive expansion method, an in-mold molding method using expanded beads, or the like. In particular, expanded beads applicable for the in-mold molding method are recently required in view of the matter that expanded molded articles having various shapes in conformity with a mold shape are obtained.

As such expanded beads, in general, there are those produced by a gas impregnation pre-expansion method as described in PTL 1; and those produced by a direct expansion method as described in PTL 2.

CITATION LIST

Patent Document

PTL 1: JP 8-113664 A
PTL 2: US 2012/0329892 A

SUMMARY OF INVENTION

However, in the case of subjecting expanded TPU beads to in-mold molding to obtain an expanded TPU molded article, expanded beads molded articles obtained from the conventional TPU expanded beads did not always have sufficient characteristics from the standpoints of compression set and modulus of repulsion elasticity of the molded articles.

In order to solve the aforementioned problem, the present invention has been made, and its object is to provide expanded beads capable of providing an expanded TPU beads molded article which is excellent in physical properties, such as compression characteristics, repulsion elasticity, etc., and an expanded TPU beads molded article which is excellent in physical properties, such as compression characteristics, repulsion elasticity, etc.

Specifically, the present invention provides the following [1] to [5].

[1] Expanded beads of thermoplastic polyurethane, wherein a Shore A hardness of the thermoplastic polyurethane is 85 or more; an average cell diameter of the expanded beads is from 50 to 300 μm; and a closed cell ratio when bisecting the expanded bead is 60% or more.

[2] The expanded beads of thermoplastic polyurethane as set forth in the above [1], wherein a melt flow rate at 190° C. under a load of 10 kg of the thermoplastic polyurethane is 60 g/10 min or less.

[3] The expanded beads of thermoplastic polyurethane as set forth in the above [1] or [2], wherein a softening temperature of the thermoplastic polyurethane is from 110 to 160° C.

[4] The expanded beads of thermoplastic polyurethane as set forth in any of the above [1] to [3], wherein an apparent density of the expanded beads is 0.3 g/cm$^3$ or less.

[5] An expanded thermoplastic polyurethane beads molded article obtained through in-mold molding of the expanded beads of thermoplastic polyurethane as set forth in any of the above [1] to [4].

TPU that constitutes the expanded beads of the present invention satisfies a predetermined Shore A hardness, and the expanded beads of the present invention have predetermined average cell diameter and closed cell ratio. The expanded beads molded article obtained through in-mold molding of such expanded beads has excellent characteristics such that not only the compression set is small, but also the modulus of repulsion elasticity is large.

DESCRIPTION OF EMBODIMENTS

Figure 1:
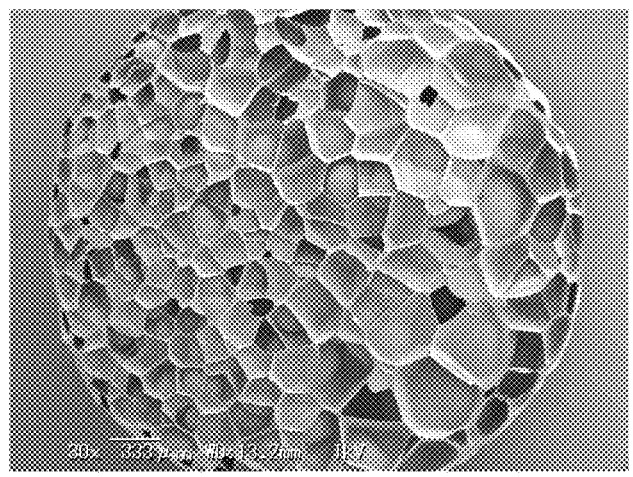
FIG. 1 is a scanning electron micrographic (SEM) photograph of a cross section of expanded beads of Example 3.
Figure 2:
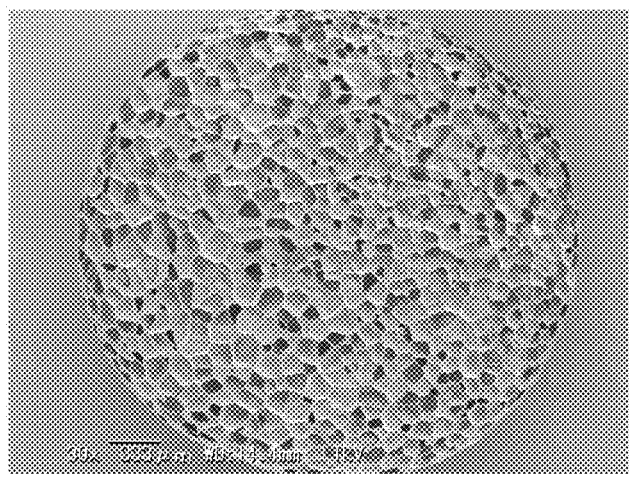
FIG. 2 is an SEM photograph of a cross section of expanded beads of Example 5.
Figure 3:
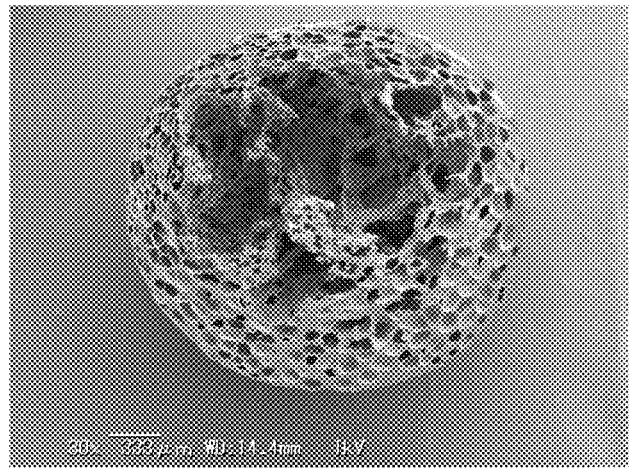
FIG. 3 is an SEM photograph of a cross section of expanded beads of Comparative Example 1.
Figure 4:
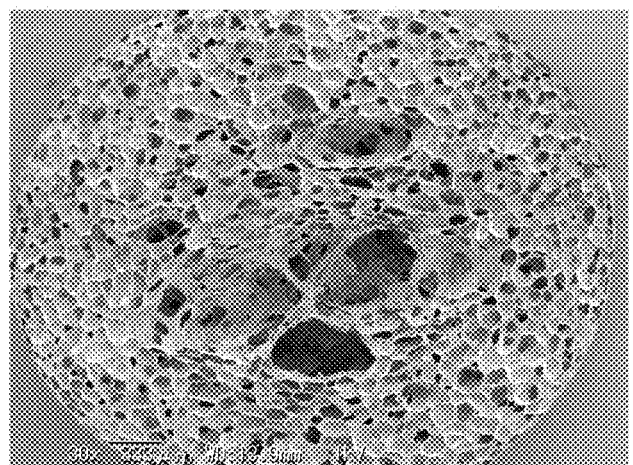
FIG. 4 is an SEM photograph of a cross section of expanded beads of Comparative Example 2.
Figure 5:
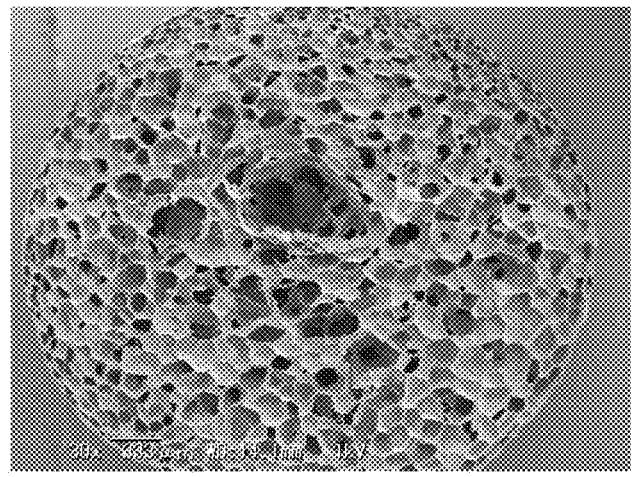
FIG. 5 is an SEM photograph of a cross section of expanded beads of Comparative Example 3.

In the expanded TPU beads of the present invention, a Shore A hardness of TPU that constitutes the expanded beads is 85 or more, an average cell diameter of the expanded beads is 50 to 300 μm, and a closed cell ratio when bisecting the expanded TPU bead is 60% or more.

[Thermoplastic Polyurethane (TPU)]

TPU that constitutes the expanded beads of the present invention has a structure in which a soft segment having a long-chain polyol and diisocyanate polymerized therein via a urethane bond and a hard segment having a short-chain glycol and diisocyanate polymerized therein via a urethane bond are mutually bonded to each other. In addition, principally, the soft segment reveals stretchability, and the urethane bonding part produces a firm hydrogen bond. The hardness of TPU may be adjusted by a ratio of the soft segment and the hard segment without requiring an additive, such as a plasticizer, etc.

TPU mainly includes an ester-based type and an ether-based type, and in particular, a long-chain polyol type influences the characteristics of resulting TPU. The ester-based TPU is excellent especially in mechanical strength, heat resistance, and so on. Meanwhile, the ether-based TPU is excellent in cold resistance, hydrolysis resistance, fungus resistance, and so on. In consequence, the kind of the TPU resin bead to be used may be properly selected according to the characteristics required for the expanded TPU beads molded article.

Examples of the long-chain polyol that constitutes the ester-based TPU include compounds obtained through a condensation reaction between a polyhydric alcohol, such as ethylene ether glycol, propylene glycol, butanediol, butenediol, hexanediol, pentanediol, neopentyldiol, pentanediol, etc., and a dibasic acid, such as adipic acid, sebacic acid, azelaic acid, terephthalic acid, isophthalic acid, maleic acid, an aromatic carboxylic acid, etc.; lactone-based ester polyols, such as those obtained through ring-opening polymerization of ε-caprolactone or γ-valerolactone; polycarbonate polyols; and the like.

Meanwhile, examples of the long-chain polyol that constitutes the ether-based TPU include polyethylene glycol, polypropylene ether glycol, polytetramethylene ether glycol, polyhexamethylene ether glycol, and the like.

Examples of the short-chain glycol include ethylene glycol, propylene glycol, butanediol, butenediol, pentanediol, neopentyl glycol, hexanediol, cyclohexanediol, diethylene glycol, diethanolamine, triethanolamine, and the like.

Examples of the diisocyanate include tolylene diisocyanate (TDI), diphenylmethane diisocyanate (MDI), hexamethylene diisocyanate, naphthalene diisocyanate, isophorone diisocyanate, xylylene diisocyanate, and the like.

A constitutional element of the aforementioned TPU is not particularly limited. The constitutional element of the aforementioned TPU is properly selected according to physical properties required for the resulting expanded TPU beads molded article. In consequence, all of the aforementioned ether-based TPU and ester-based TPU are applicable. The ester-based TPU has such advantages that it is higher in mechanical strength and also excellent in adhesiveness to other resin materials at the time of in-mold molding. In addition, the ester-based TPU is good in affinity with carbon dioxide that is properly used as a blowing agent and readily makes an expansion ratio of the expanded beads high. Meanwhile, the ether-based TPU has such advantages that it is able to make a molding pressure at the time of molding low and that hardly causes shrinkage of the molded article.

The expanded beads of the present invention are constituted of the aforementioned TPU. However, other polymer, such as a polyolefin, a styrene-based elastomer, a styrene-based resin, etc., may be mixed with the aforementioned TPU and used according to the application and object of the expanded beads molded article within a range where the object of the present invention is not impaired. The use amount of such other polymer is preferably 30 parts by mass or less, more preferably 20 parts by mass or less, and still more preferably 10 parts by mass or less based on 100 parts by mass of TPU.

In TPU that constitutes the aforementioned expanded beads, its softening temperature is preferably 110 to 160° C. When the softening temperature of TPU falls within the aforementioned range, expanded beads that are excellent in moldability and fusion bonding properties are provided. From the aforementioned viewpoint, the lower limit of the softening temperature is more preferably 115° C.

In TPU that constitutes the expanded beads, a melt flow rate (MFR) at 190° C. under a load of 10 kg is preferably 60 g/10 min or less. When the MFR falls within the aforementioned range, unification of the cells is hardly generated at the time of expansion, and fracture of the cell film is hardly generated, too. In consequence, the expanded beads satisfying the aforementioned requirements become expanded beads with good physical properties. The lower limit of the MFR is preferably 1 g/10 min, and more preferably 5 g/10 min. Meanwhile, the upper limit of the MFR is preferably 50 g/10 min, and more preferably 40 g/10 min.

In TPU that constitutes the expanded beads, a Shore A hardness is 85 or more.

In the case where the Shore A hardness is less than 85, a proportion of the hard segment that constitutes TPU is low, so that it is difficult to keep the shape of the expanded bead after the expansion. In addition, it is difficult to obtain an expanded beads molded article that is not only small in the compression set but also large in the modulus of repulsion elasticity.

The upper limit of the Shore A hardness is preferably approximately 95 or less from the viewpoint that the molding pressure of the expanded beads becomes high, so that the moldability of the expanded beads is worsened. In particular, in the case of using carbon dioxide as the blowing agent, after expanding the resin beads, the expanded beads are liable to be shrunk. From the viewpoint of suppressing this shrinkage, the lower limit of the Shore A hardness is preferably 86, whereas its upper limit is preferably 93.

Here, the Shore A hardness means a Shore A hardness as measured in conformity with ASTM D2240. Specifically, the Shore A hardness is a value as measured on a flat surface of the molded article under conditions at a temperature of 23° C. and a relative humidity of 50% by using a commercially available Shore hardness tester, such as ASKER Durometer Type A (manufactured by Kobunshi Keiki Co., Ltd.) that is a type A durometer, a digital hardness tester (manufactured by Toyo Seiki Seisaku-sho, Ltd.), etc.

The softening temperature, melt flow rate (MFR), and Shore A hardness of TPU that constitutes the expanded beads are those as measured with respect to the expanded beads after undergoing a pre-treatment by the method described in Examples as described later.

[Expanded Beads]

An average cell diameter of the expanded TPU beads of the present invention is 50 to 300 μm.

In the case where the average cell diameter is less than 50 μm, there is a concern that the physical properties of the expanded beads molded article, such as compression set, modulus of repulsion elasticity, etc., are worsened. From the aforementioned viewpoint, the lower limit of the average cell diameter is preferably 70 μm, more preferably 100 μm, and still more preferably 110 μm. Meanwhile, in the case the average cell diameter is more than 300 μm, there is a concern that it becomes difficult to obtain a good expanded beads molded article. From the aforementioned viewpoint, the upper limit of the average cell diameter is preferably 280 μm, more preferably 250 μm, and still more preferably 230 μm.

The aforementioned average cell diameter may be measured in the following manner. First of all, the expanded bead is approximately bisected, and an enlarged photograph of the cut section is taken. In this enlarged photograph, four line segments passing through an approximate center of the cut surface of the cell are drawn so as to form radial and straight lines extending in eight directions at an equal angle from the approximate center of the cut surface of the cell toward the surface of the cut bead. Then, the number N of cells crossing the aforementioned four line segments is measured. Meanwhile, a total length L (μm) of the aforementioned four line segments is measured. A value obtained by dividing the total length L by the cell number N (L/N) is the aforementioned average cell diameter.

When an average cell diameter (A) in the central part of the aforementioned expanded TPU bead is 300 μm or less, a cavity part is not formed in the central part of the expanded bead, and therefore, the expanded beads have excellent moldability. From the aforementioned viewpoint, the upper limit of the average cell diameter (A) of the central part of the expanded bead is more preferably 280 μm, and still more preferably 250 μm.

A ratio (A/B) of the average cell diameter (A) in the central part of the expanded bead to an average cell diameter (B) in the surface layer part of the expanded bead is preferably 5 or less. In the case where the average cell diameter (A) and the average cell diameter (B) satisfy the aforementioned ratio, the cell diameter of the expanded beads becomes more uniform, and therefore, the expanded beads have excellent dimensional stability and excellent physical properties. From the aforementioned viewpoint, the lower limit of the aforementioned ratio (A/B) is more preferably 0.5, still more preferably 0.8, and most preferably 1.0. Meanwhile, the upper limit of the aforementioned ratio (A/B) is more preferably 2, and still more preferably 1.6.

The aforementioned average cell diameters (A) and (B) may be measured in the following manner. First of all, in an enlarged photograph of the cut surface obtained by bisecting the expanded bead, four line segments passing through an approximate center of the cut surface of the cell are drawn from one surface (contour) of the expanded bead toward the other surface. Each of the aforementioned four line segments is trisected, and the average cell diameter of the cells existent on each of the trisected line segments is determined. Two external portions of the trisected line segment are defined as the surface layer part, whereas one internal portion is defined as the central part. In the aforementioned enlarged photograph, in the case where excessively large cells (cavity portion) of 500 μm or more extending the trisected line segments are existent, in the central part, the cell diameter is measured as it is, whereas in the surface layer part, the cell diameter is measured after eliminating such excessively large cells.

From the viewpoint of lightness in weight, an apparent density of the aforementioned expanded TPU beads is preferably 0.3 g/cm³ or less. Even if the apparent density of the expanded beads is 0.3 g/cm³ or less, the expanded beads of the present invention not only have excellent secondary expandability but also have excellent moldability. The lower limit of the apparent density is more preferably 0.02 g/cm³, and still more preferably 0.03 g/cm³. Meanwhile, the upper limit of the apparent density is more preferably 0.25 g/cm³, and still more preferably 0.2 g/cm³.

The closed cell ratio (C) of the aforementioned expanded beads is preferably 70% or more from the viewpoints of expansion moldability of the expanded beads, mechanical strength and surface smoothness of the expanded beads molded article obtained from the aforementioned expanded beads, and so on. The lower limit of the closed cell ratio (C) is more preferably 80%, and still more preferably 90%.

A closed cell ratio (D) when bisecting the expanded bead is 60% or more. So long as expanded beads satisfying the aforementioned requirements are concerned, a cavity portion (excessively large cells) which is considered to be formed due to melting of the resin is not existent within the expanded beads, and therefore, the expanded beads have excellent moldability and excellent physical properties. In the case where the closed cell ratio (D) is less than 60%, the expanded beads have a cavity portion, and therefore, the moldability of the expanded beads is remarkably worsened, so that a good expanded beads molded article is not obtained.

The closed cell ratio (D) when bisecting the expanded bead refers to a closed cell ratio as measured in a sample obtained through cutting by bisecting the expanded bead. In addition, the bisection as referred to herein is not required to be precious bisection but is enough so long as the volume is approximately bisected through visual inspection.

In the case where excessively large cells are existent in the expanded beads, the closed cell ratio (D) when bisecting the expanded bead tends to be extremely lowered as compared with the closed cell ratio (C) of the expanded beads. Here, the closed cell ratio (C) is a closed cell ratio as measured without bisecting the expanded bead. On the occasion of measuring the closed cell ratio (C), even when the excessively large cells are existent, the closed cell ratio (C) is measured as the closed cells as the whole of expanded beads. Meanwhile, when the expanded bead is bisected, the closed cell ratio (D) is measured in a state where the excessively large cells are exposed. From the foregoing, the presence or absence of excessively large cells may be distinguished according to the closed cell ratio (D). From the aforementioned viewpoint, the lower limit of the closed cell ratio (D) is preferably 65%, and more preferably 70%.

The closed cell ratio (C) may be measured in the following manner. First of all, the expanded beads having a bulk volume of about 20 cm³ after aging are used as a measurement sample, and a mass W (g) of the expanded beads and an apparent volume Va (cm³) of the expanded beads by the water immersion method are measured in a thermostat chamber. Thereafter, the measurement sample is thoroughly dried, and a true volume Vx (cm³) (the sum of the volume of the resin that constitutes the expanded beads and the total volume of the closed cells within the expanded beads) is then measured using an air comparison pycnometer 930 type (manufactured by Toshiba-Beckman Co., Ltd.) in conformity with Procedure C of ASTM D2856. Then, the closed cell ratio (C) (%) is calculated while defining the density of the TPU raw material resin as ρ according to the following formula.

$$\text{Closed cell ratio (\%)} = \{(Vx-W/\rho)/(Va-W/\rho)\} \times 100$$

The sample after measuring the closed cell ratio (C) is approximately bisected with a cutter or the like. The bisected sample is again measured for Vx (D). Then, similar to the calculation of the aforementioned closed cell ratio (C), by substituting the Vx (D) for the aforementioned formula, the closed cell ratio (D) (%) when bisecting the expanded bead is calculated.

A maximum bead diameter of the aforementioned expanded beads is preferably 1 to 8 mm. When the maximum bead diameter falls within the aforementioned range, when the resin beads are expanded, or when the cells are formed or grown, the matter that the surfaces of the expanded beads are abruptly cooled, whereby the cells become non-uniform is not caused. In consequence, the expanded beads molded article obtained from such expanded beads has excellent physical properties. From the aforementioned viewpoint, the lower limit of the maximum bead diameter is more preferably 1.5 mm, and still more preferably 2 mm. Meanwhile, the upper limit of the maximum bead diameter is more preferably 5 mm, and still more preferably 4 mm. The maximum bead diameter of the expanded bead as referred to in the present specification means a maximum diameter of each of the expanded beads, and a minimum bead diameter means a minimum diameter of each of the expanded beads.

A ratio of the maximum bead diameter to the minimum bead diameter is preferably 2 or less. The lower limit of the ratio of the maximum bead diameter to the minimum bead diameter is preferably 1, whereas its upper limit is preferably 1.5. The ratio of the maximum bead diameter to the minimum bead diameter means a value obtained by measuring the maximum bead diameter (Q) and the minimum bead diameter (R) of each of the expanded bead and calculating a ratio thereof (Q/R).

[Production Method of Expanded TPU Beads]

Although the expanded TPU beads of the present invention are not particularly limited with respect to the production method thereof, it is preferred to obtain them by a production method including the following steps (1) and (2). Specifically, the expanded TPU beads of the present invention are obtained through a production method including a step (1) of dispersing TPU resin beads in a dispersion medium within a closed vessel and impregnating carbon dioxide in the resin beads under heating, to form expandable resin beads; and a step (2) of releasing the expandable resin beads from the closed vessel under a low pressure at a temperature that is lower by 30° C. than the softening temperature of the TPU or higher and expanding them, thereby obtaining expanded TPU beads.

Such a production method of expanded beads is called a direct expansion method. Specifically, first of all, a blowing agent is impregnated in the resin beads in the dispersion medium within the closed vessel under a high pressure at a relatively high temperature, thereby obtaining the expandable resin beads. The expandable resin beads are then released as they are from the closed vessel under a low pressure together with the dispersion medium, thereby obtaining the expanded beads.

The expanded beads of the present invention may be obtained by the direct expansion method using carbon dioxide as the blowing agent. According to the aforementioned method, expanded beads having an average cell diameter of 50 to 300 μm may be readily produced. Furthermore, by using carbon dioxide as the blowing agent, an explosion-proof countermeasure as in a conventional case of using an inflammable hydrocarbon, such as butane, etc., is not required. In consequence, in the production equipment, it is easy to secure safety, and the equipment investment costs may be reduced.

<Step (1)>

First of all, in the aforementioned step (1), TPU resin beads are dispersed in a dispersion medium within a closed vessel, and carbon dioxide is impregnated in the resin beads under heating, thereby obtaining expandable resin beads.

Specifically, in a state of dispersing the resin beads in the dispersion medium within the closed vessel, carbon dioxide as the blowing agent is introduced into the closed vessel, followed by heating. At this time, the inside of the closed vessel becomes a high-temperature high-pressure atmosphere, and therefore, the carbon dioxide is impregnated in the softened resin beads.

A melt flow rate (MFR) at 190° C. under a load of 10 kg of the TPU resin bead which is used as the raw material is preferably 40 g/10 min or less. When the melt flow rate (MFR) falls within the aforementioned range, influences of hydrolysis of the TPU resin at the time of production of the expanded beads become small. In addition, unification of the cells at the time of expansion and fracture of the cell film at the time of expansion are suppressed, and therefore, a cavity portion is hardly formed in the central portion of the expanded bead. In consequence, good expanded beads may be obtained. From the aforementioned viewpoint, the lower limit of the MFR is preferably 0.1 g/10 min, and more preferably 0.3 g/10 min. Meanwhile, the upper limit of the MFR is preferably 30 g/10 min, and more preferably 20 g/10 min.

A softening temperature of the TPU resin bead which is used as the raw material is preferably 120 to 170° C. When the softening temperature falls within the aforementioned range, the matter that at the temperature when the resin beads are expanded, the cell film is fractured without withstanding the heating, or excessively large cells are formed in the expanded beads, is not caused. In consequence, the resulting expanded beads have excellent secondary expandability or moldability. In addition, in the case of using water as the dispersion medium at the time of expansion, the progress of hydrolysis of TPU is suppressed. From the aforementioned viewpoint, the lower limit of the softening temperature is preferably 125° C., and more preferably 130° C. Meanwhile, the upper limit of the softening temperature is preferably 165° C., and more preferably 160° C.

Although a mass of one TPU resin bead is properly selected according to the size or expansion ratio of the target expanded TPU bead, it is preferably 0.5 to 30 mg. The lower limit of the mass is more preferably 1 mg. Meanwhile, the upper limit of the mass is more preferably 20 mg. When the mass falls within the aforementioned range, the expanded TPU beads have a size at which they are easily filled within a mold. In addition, the expanded beads have excellent moldability.

The TPU resin beads are not particularly limited with respect to the production method thereof but may be obtained by a known method. For example, the TPU resin beads are obtained by extruding a resin melt into a strand-like form from small holes of a nozzle annexed in a tip of an extruder and then cutting the extruded resin melt by a pelletizer such that the resin melt has a predetermined mass.

The TPU resin beads may be properly blended with various additives which are usually used, such as a cell adjusting agent, an antistatic agent, an electrical conductivity imparting agent, a lubricant, an antioxidant, a UV absorbing agent, a flame retardant, a metal-deactivator, a pigment, a dye, a crystal nucleus agent, a filler, etc., as the need arises. Examples of the cell adjusting agent include inorganic materials such as talc, sodium chloride, calcium carbonate, silica, titanium oxide, gypsum, zeolite, borax, aluminum hydroxide, carbon, etc., as well as a phosphate-based nucleus agent, a phenol-based nucleus agent, an amine-based nucleus agent, and an organic nucleus agent such as polytetrafluoroethylene (PTFE), etc. Although the addition amount of such an additive of every kind varies with the application purpose of the expanded beads molded article, it is preferably 25 parts by mass or less based on 100 parts by mass of the aforementioned TPU. In addition, the upper limit of the addition amount is more preferably 15 parts by mass, still more preferably 10 parts by mass, and most preferably 5 parts by mass.

The TPU resin beads are dispersed in an aqueous medium (typically water) that is a dispersion medium in a pressurizable closed vessel, such as an autoclave, etc.

In the dispersion medium, it is preferred to add a dispersant, such as a sparingly water-soluble inorganic material, e.g., aluminum oxide, tricalcium phosphate, magnesium pyrophosphate, zinc oxide, kaolin, mica, talc, etc., as the need arises. In addition, a dispersing aid, such as an anionic surfactant, e.g., sodium dodecylbenzenesulfonate, a sodium alkanesulfonate, etc., may also be added in the dispersion medium. In the addition amount of the dispersant, a mass ratio of the resin bead to the dispersant ((resin bead)/(dispersant)) is preferably 20 to 2,000. The lower limit of the mass ratio of the resin bead to the dispersant is more preferably 30, and the upper limit thereof is more preferably 1,000. In addition, a mass ratio of the dispersant to the dispersing aid ((dispersant)/(dispersing aid)) is preferably 1 to 500. The upper limit of the mass ratio of the dispersant to the dispersing aid is more preferably 100.

It is preferred to use carbon dioxide as the blowing agent. By using carbon dioxide, it becomes possible to prevent refinement of cells at the time of expansion from occurring. Then, the expanded beads having an average cell diameter falling within a predetermined range are readily obtained by the direct expansion method. In addition, among the inorganic blowing agents, carbon dioxide has high compatibility with TPU, and therefore, the carbon dioxide may be uniformly impregnated in the TPU resin beads with good efficiency. Furthermore, when carbon dioxide is used as the blowing agent, an explosion-proof countermeasure is not required, and it is easy to secure safety. In consequence, the equipment investment costs become low.

At least carbon dioxide has only to be used as the blowing agent, and other physical blowing agent or chemical blowing agent may also be used in combination.

Examples of other physical blowing agent include an organic physical blowing agent and an inorganic physical blowing agent. Examples of the organic physical blowing agent include aliphatic hydrocarbons, such as propane, butane, hexane, pentane, heptane, etc.; alicyclic hydrocarbons, such as cyclobutane, cyclohexane, etc.; halogenated hydrocarbons, such as chlorofluoromethane, trifluoromethane, 1,1-difluoroethane, 1,1,1,2-tetrafluoroethane, methyl chloride, ethyl chloride, methylene chloride, etc.; dialkyl ethers, such as dimethyl ether, diethyl ether, methyl ethyl ether, etc.; and the like. In addition, examples of the inorganic physical blowing agent include nitrogen, argon, air, water, and the like.

The use amount of the blowing agent is properly determined while taking into account the apparent density of the target expanded bead, the kind of TPU, or the like. Typically, the use amount of the blowing agent is preferably 0.5 to 30 parts by mass based on 100 parts by mass of the resin beads. In addition, a blending ratio of carbon dioxide in the blowing agent is preferably 50% by mass or more. The lower limit of the blending ratio of the carbon dioxide is more preferably 70% by mass, and still more preferably 90% by mass. The blending ratio of the carbon dioxide is most preferably 100% by mass.

In order to thoroughly impregnate carbon dioxide in the TPU resin beads within a short time, it is preferred to undergo the impregnation step under heating. In addition, the impregnation step is preferably performed by heating at a temperature that is lower by 30° C. than the softening temperature of the TPU resin bead or higher.

The lower limit of the pressure (impregnation pressure) within the aforementioned closed vessel is preferably 0.5 MPa(G), more preferably 1.0 MPa(G), and still more preferably 2.0 MPa(G) from the viewpoint of thoroughly impregnating carbon dioxide in the TPU resin beads. Meanwhile, the upper limit of the pressure (impregnation pressure) within the aforementioned closed vessel is approximately 10 MPa(G), more preferably 8.0 MPa(G), still more preferably 7.0 MPa(G), and most preferably 5.0 MPa(G). When the pressure falls within the aforementioned range, the carbon dioxide may be thoroughly impregnated in the TPU resin beads. In addition, the pressure resistance of the closed vessel is relatively easily secured.

A time for heating (impregnation time) is properly set according to the pressure within the closed vessel, the kind or mass of the TPU resin bead, or the like. From the viewpoint of productivity, the time for heating is preferably 0.05 to 3 hours. The lower limit of the time for heating (impregnation time) is more preferably 0.1 hours, and its upper limit is more preferably 1 hour.

In the foregoing way, the blowing agent is impregnated in the TPU resin beads, thereby obtaining expandable resin beads.

<Step (2)>

Next, in the step (2), it is preferred that the expandable resin beads are released from the closed vessel under a low pressure at a temperature that is lower by 30° C. than the softening temperature (Ts) of the TPU resin bead ((Ts-30)° C.) or higher and expanded, thereby obtaining expanded TPU beads.

On the occasion of releasing the expandable resin beads under a low pressure, the temperature (expansion temperature) within the closed vessel is set to a temperature that is lower by 30° C. than the softening temperature of TPU or higher. By using carbon dioxide as the blowing agent and performing the expansion in such a temperature range, expanded beads having a high expansion ratio, an average cell diameter of 50 to 300 μm, and a low apparent density are readily obtainable.

From the aforementioned viewpoint, the lower limit of the expansion temperature is more preferably a temperature that is lower by 27° C., and still more preferably a temperature that is lower by 25° C., than the softening temperature of the TPU resin bead. Meanwhile, the upper limit of the expansion temperature is more preferably a temperature that is lower by 5° C., and still more preferably a temperature that is lower by 10° C., than the softening temperature of the TPU resin bead.

On the occasion of releasing the expandable resin beads from the closed vessel, it is preferred to keep the temperature and pressure within the opened vessel at fixed levels or to increase them step-by-step by using carbon dioxide, air, or the like. According to the aforementioned method, scattering in the apparent density or cell diameter of the resulting expanded beads may be minimized.

The expanded TPU beads are liable to cause shrinkage especially when expanded at a high expansion ratio. This shrinkage is caused due to the matter that the inside of the cell becomes in a reduced pressure state when the high-temperature gas existent in the cell of the expanded bead is cooled or dissipated outside of the expanded bead. In particular, the carbon dioxide is liable to be dissipated outside the expanded bead, and therefore, shrinkage of the expanded bead is liable to be caused. In such a case, it is preferred that the expanded beads after expansion are subjected to a pressurization treatment with air and then aged in a stable state under atmospheric pressure. Specifically, the resulting expanded beads are put into a closed vessel and subjected to a pressurization treatment with compressed air of 0.3 MPa at 30° C. for 12 hours. Thereafter, the pressure of the closed vessel is released, and the expanded beads having been subjected to a pressurization treatment under atmospheric pressure at 40° C. for 24 hours are allowed to stand, thereby undergoing aging. Meanwhile, in the case of carbon dioxide as the blowing agent, expanded beads having a specified cell diameter are provided, so that it is possible to obtain an expanded beads molded article having excellent physical properties.

In the case where it is contemplated to make the expansion ratio of the expanded beads as obtained above higher, two-stage expansion may be performed, as the need arises. For example, expanded beads having a lower apparent density may be obtained through heating of the expanded beads by using steam, heated air, or the like in a high-pressure atmosphere, or other means.

[Expanded Beads Molded Article]

The expanded beads molded article obtained by subjecting the expanded TPU beads of the present invention to in-mold molding has excellent characteristics as described later.

From the viewpoint that the characteristics, such as repulsion elasticity, lightness in weight, etc., are thoroughly exhibited, a lower limit of the density of the expanded TPU beads molded article is preferably 0.05 g/cm$^3$, more preferably 0.1 g/cm$^3$, and still more preferably 0.15 g/cm$^3$. Meanwhile, an upper limit of the density of the expanded TPU beads molded article is preferably 0.4 g/cm$^3$, more preferably 0.3 g/cm$^3$, and still more preferably 0.25 g/cm$^3$.

The compression set of the expanded TPU beads molded article is preferably 3% or less. When the compression set falls within the aforementioned range, the expanded beads molded article is able to surely exhibit its excellent restoring properties. From the aforementioned viewpoint, the upper limit of the compression set is more preferably 2.5%. In addition, a compression stress at the time of 50% strain of the expanded beads molded article is preferably 300 kPa or less. The upper limit of the compression stress at the time of 50% strain is more preferably 290 kPa.

The modulus of repulsion elasticity of the expanded TPU beads molded article is preferably 45% or more. When the modulus of repulsion elasticity falls within the aforementioned range, the expanded TPU beads molded article may be applied to wide-ranging applications.

The in-mold molding method for obtaining the expanded TPU beads molded article of the present invention is not particularly limited, and the molded article having a desired form may be obtained by a known method. For example, the following methods are exemplified.

First of all, the expanded beads are filled in a known mold cavity for in-mold molding of expanded thermoplastic resin beads, which is possible for heating and cooling and is able to be opened or closed and hermetically sealed. Then, a saturated water vapor having a saturated vapor pressure of 0.05 to 0.48 MPa(G) (maximum value of the saturated vapor pressure of water vapor to be fed into the mold), and preferably 0.08 to 0.42 MPa(G) is fed, and the expanded beads are heat swollen within the mold cavity to mutually fuse the expanded beads, thereby forming an expanded beads molded article. Subsequently, this expanded beads molded article is cooled and then taken out from the mold cavity. The expanded TPU beads molded article may be produced by adopting such a batch-type in-mold molding method (see, for example, JP 4-46217 B, JP 6-49795 B, etc.).

The expanded TPU beads molded article may also be produced by a continuous molding method (see, for example, JP 9-104026 A, JP 9-104027 A, JP 10-180888 A, etc.).

As a method of filling the expanded beads in a mold for molding, such as a mold cavity, etc., a known method may be adopted. For example, a compression filling method, a cracking filling method, and so on may also be adopted. In addition, similar to the operation in the aforementioned two-stage expansion, the pressure within the expanded bead is adjusted to 0.1 to 1.0 MPa(G) in a high-pressure atmosphere. Then, those expanded beads may be filled in the mold and molded.

As for the heating method with a saturated water vapor in the in-mold molding method, heating methods, such as one-direction flow heating, reversed one-direction flow heating, main heating, etc., may be properly combined according to a known method. In particular, a method of heating the expanded beads in the order of preheating, one-direction flow heating, reversed one-direction flow heating, and main heating is preferred.

The one-direction flow heating means feeding a heating medium to the inner portion of either a male mold or a female mold to heat the expanded beads within the cavity, followed by ejecting the heating medium from the inner portion of the other female mold or male mold. In addition, the case where the mold to which the heating medium is fed and the mold from which the heating medium is ejected are opposite to those of the case of the aforementioned one-direction flow heating refers to the reversed one-direction flow heating.

EXAMPLES

The present invention is hereunder described in more detail by reference to Example, but it should be construed that the present invention is by no means limited thereto.

[Evaluations and Measurement Methods]

Various physical properties of raw material resin beads, expanded beads, and expanded beads molded articles in the following Examples and Comparative Examples are those obtained by the following evaluations and measurements.

(1) Softening Temperature

The softening temperature was measured by means of thermomechanical analysis (TMA; Thermo-Mechanical Analyzer) in conformity with JIS K7196:1991. A thermomechanical analyzer, TMA7100 (manufactured by Hitachi High-Tech Science Corporation) with a penetration probe (diameter: 1.0 mm) was used. When this probe was applied with a load of 98 mN and pushed against a sample having a thickness of 2 mm, and the temperature was raised at a temperature rise rate of 5° C./min in a measurement temperature range of from 30 to 250° C., a penetration depth (amount of displacement) of the probe was measured. A temperature at which the amount of displacement abruptly changed was extrapolated to determine the softening temperature.

The softening temperature of the expanded bead was measured in the following manner. That is, after thoroughly degassing the expanded beads by using a heat press, a sample having a thickness of 2 mm was prepared using a heat press disk heated at 200° C., and the sample was allowed to stand for aging in a thermostat chamber at a relative humidity of 50% and 23° C. for 10 days, followed by performing the measurement.

(2) Melt Flow Rate (MFR)

The melt flow rate was measured under test conditions at 190° C. under a load of 10 kg on the basis of JIS K 7210:1999.

The MFR of the expanded bead was measured in the following manner. That is, a sample obtained by allowing the expanded beads to stand for aging in a thermostat chamber at a relative humidity of 50% and 23° C. for 10 days was thoroughly degassed within a cylinder of a measuring device, followed by performing the measurement.

(3) Shore A Hardness

The Shore A hardness (type A durometer hardness) was measured on a flat surface of a sample under conditions at a relative humidity of 50% and 23° C. by using ASKER Durometer Type A (manufactured by Kobunshi Keiki Co., Ltd.) that is a type A durometer in conformity with ASTM D2240.

The Shore A hardness of the expanded bead was measured in the following manner. That is, after thoroughly degassing the expanded beads by using a heat press, a sample having a thickness of 2 mm was prepared using a heat press disk heated at 200° C., and the sample was allowed to stand for aging in a thermostat chamber at a relative humidity of 50% and 23° C. for 10 days, followed by performing the measurement.

Measured values of the following (4) to (7) with respect to the expanded beads are values of a sample obtained in the following manner. That is, the resulting expanded beads were put into a closed vessel and subjected to a pressurization treatment with compressed air of 0.3 MPa(G) at 30° C. for 12 hours, the pressure of the closed vessel was then released, and the resultant was allowed to stand under atmospheric pressure at 40° C. for 24 hours and then allowed to stand for aging in a thermostat chamber at a relative humidity of 50% and 23° C. for 10 days, followed by performing the measurement.

(4) Apparent Density

In a graduated measuring cylinder charged with water at 23° C., about 500 mL of expanded beads $W_1$ (g) were sunk using a wire net. A volume $V_1$ (cm$^3$) of the group of expanded beads was determined from the water level rise while taking into account the volume of the wire net. Then, the mass $W_1$ (g) of the expanded beads charged in the graduated measuring cylinder was divided by the volume $V_1$ ($W_1/V_1$), to determine the apparent density (g/cm$^3$) of the expanded beads.

(5) Average Cell Diameter

An enlarged photograph of a cut surface of the approximately bisected expanded bead by a microscope was taken. Four line segments passing through an approximate center of the cut surface of the cell were drawn from one surface (contour) of the expanded bead of this photograph toward the other surface. These line segments were drawn so as to form radial and straight lines extending in eight directions at an equal angle from the approximate center of the cut surface of the cell toward the surface of the cut bead. Then, the number N of cells crossing the aforementioned four line segments was measured. A value obtained by dividing a total length L (μm) of the aforementioned four line segments by the cell number N (L/N) was defined as the average cell diameter of one expanded bead. The same operations were performed with respect to ten expanded beads, and a value obtained through an arithmetic mean of the average cell diameter of each expanded bead was defined as the average cell diameter of the expanded beads.

(6) Average Cell Diameter of Central Part and Surface Layer Part

An enlarged photograph of a cut surface of the approximately bisected expanded bead by a microscope was taken. Four line segments passing through an approximate center of the cut surface of the cell were drawn from one surface (contour) of the expanded bead of this photograph toward the other surface. Subsequently, each of these four line segments was trisected, and the average cell diameter of the cells existent on the each of the trisected line segments was determined in the same method as in the average cell diameter of the above (5).

Two external portions of the trisected line segment were defined as the surface layer part, whereas one internal portion was defined as the central part. In the case where excessively large cells of 500 μm or more extending the trisected line segments were existent, in the central part, the cell diameter was measured as it was, whereas in the surface layer part, the cell diameter was measured after eliminating such excessively large cells. According to the aforementioned way, a value obtained through an arithmetic mean of the measured value of each expanded bead with respect to the ten expanded beads was calculated.

(7) Closed Cell Ratio

The expanded beads having a bulk volume of about 20 cm$^3$ were used as a measurement sample. In addition, a mass W (g) of the sample was measured. An apparent volume Va (cm$^3$) was measured by the water immersion method. After the measurement sample was thoroughly dried, a true volume Vx (cm$^3$) (the sum of the volume of the resin that constitutes the expanded beads and the total volume of the closed cells within the expanded beads) was then measured using an air comparison pycnometer 930 type (manufactured by Toshiba-Beckman Co., Ltd.) in conformity with Procedure C of ASTM D2856. Then, the closed cell ratio (C) (%) was calculated according to the following formula. The density of the resin that constitutes the expanded beads is defined as $\rho$ (g/cm$^3$).

$$\text{Closed cell ratio}(C)(\%)=\{(Vx-W/\rho)/(Va-W/\rho)\}\times 100$$

The same operations were performed with respect to five samples, and an average value of the closed cell ratio of each sample was defined as the closed cell ratio (C) of the expanded beads.

The sample after the measurement was approximately bisected with a cutter and again measured for Vx (D). The closed cell ratio (D) (%) when bisecting the expanded bead was calculated according to the following formula in the same manner as in the aforementioned closed cell ratio (C).

$$D(\%)=\{(Vx(D)-W/\rho)/(Va-W/\rho)\}\times 100$$

Measured values of the following (8) to (13) with respect to the expanded beads molded article are values of a sample obtained in the following manner. That is, the resulting expanded beads molded article was aged under atmospheric pressure at 40° C. for 24 hours and then allowed to stand for aging in a thermostat chamber at a relative humidity of 50% and 23° C. for 10 days, followed by performing the measurement.

(8) Density of Molded Article

A value obtained by dividing a mass of the expanded beads molded article by a volume determined from the outside dimension of the expanded beads molded article was determined and subjected to unit conversion.

(9) Degree of Fusion Bonding

A sample of 170 mm in length×30 mm in width×33 mm in thickness was cut out from an expanded beads molded article which was molded in a mold cavity of 200 mm in length×60 mm in width×33 mm in thickness. One of the surfaces of this sample was incised with a cutter knife in a depth of about 15 mm so as to bisect the length of the molded article, and the molded article was bent from the incised part and fractured. A value of a ratio (m/n) of the number (m) of material-fractured expanded beads existent on the fractured surface to the number (n) of expanded beads existent on the fractured surface was calculated and defined as a degree of fusion bonding. The number (n) of expanded beads is the sum total of the number (m) of material-fractured expanded beads and the number of expanded beads exfoliated between the expanded beads.

As the m/n value increases, the fusion of the expanded beads each other becomes stronger, and thus, the expanded beads molded article is excellent in mechanical physical properties, such as bending strength, tensile strength, etc. In the case where even when bending the molded article, the molded article could not be fractured, the degree of fusion bonding was defined as 100%.

(10) Shrinkage Factor

From a mold dimension of 200 mm in length and a length X of an expanded beads molded article corresponding to the mold dimension when molded and then aged at 40° C. for 24 hours, a shrinkage factor S (%) was calculated according to the following formula.

$$S(\%)=\{(200-X)/200\}\times 100$$

(11) Compression Stress

A rectangular parallelepiped-shaped sample of 50 mm in length×50 mm in width×25 mm in thickness was cut out from the central part of an expanded beads molded article. Using this sample, the compression stress was measured in conformity with JIS K 6767:1999. Using an autograph, AGS-X (manufactured by Shimadzu Corporation), a load at the time of 50% strain was measured at a compression rate of 10 mm/min, and this was divided by a pressure-receiving area of a test piece, thereby calculating the compression stress at the time of 50% strain.

(12) Compression Set

A sample of 50 mm in length×50 mm in width×25 mm in thickness was cut out from the central part of an expanded beads molded article. Using this sample, the compression set was measured in conformity with JIS K 6767:1999. In a state where the thickness of the sample was compressed in a portion of 25%, the sample was kept at 23° C. for 22 hours and then released from the compressed state, and the sample was further allowed to stand at the same temperature for 24 hours, followed by measuring the thickness of the sample. The compression set was calculated by dividing the amount of reduction of the thickness of the sample after compression by the thickness before compression.

As a result of measuring the compression set of the raw material resins under the same conditions, except for keeping at 70° C. for 22 hours, the compression set of Resins 1 and 2 was 48%, the compression set of Resins 6 and 12 was 36%, the compression set of Resin 7 was 40%, the compression set of Resin 8 was 60%, and the compression set of Resin 9 was 44%.

(13) Modulus of Repulsion Elasticity

The modulus of repulsion elasticity was measured with a Schob type rebound tester, RT-90 (manufactured by Kobunshi Keiki Co., Ltd.) under conditions at a relative humidity of 50% and 23° C. in conformity with JIS K 6255:2013. A sample (with a molded skin) of 30 mm in length×30 mm in width×12.5 mm in thickness was cut out from the central part of an expanded beads molded article after aging. This sample was fixed with a pressure sensitive adhesive double coated tape such that the skin surface of the sample came into contact with a tip of a pendulum, and the pendulum having a hammer diameter ϕ of 15 mm and an arm weight of 0.25 kg was swung down from a position at an angle of fall of 90±1°. Then, the pendulum was allowed to come into contact with the skin surface of the sample from the thickness direction, and a rebounding height h (mm) of the pendulum was measured. The modulus of repulsion elasticity was calculated by diving the rebounding height (h) by a drop height H (mm) of the pendulum.

[Production of Resin Beads]

To 100 parts by mass of a commercially available TPU raw material resin of each grade as shown in the following Table 1, 0.10 parts by mass of talc as a cell adjusting agent was added, and the TPU raw material resin of each grade was melt kneaded with a twin-screw extruder having an inside diameter of 20 mm. The kneaded material was extruded in a strand-like form from small holes of a nozzle annexed in a tip of the extruder, cooled, and then cut to obtain about 5 mg of resin beads.

TABLE 1

| Resin | | 1 | 2 | 3 | 4 | 5 | 6 | 7 | 8 | 9 | 10 | 11 | 12 | 13 |
|---|---|---|---|---|---|---|---|---|---|---|---|---|---|---|
| Raw material resin | Maker | Bayer | Bayer | Bayer | Bayer | Bayer | Bayer | Bayer | Bayer | Bayer | BASF | BASF | Bayer | Bayer |
| | Grade | 3690 AU | 3690 AU_TW | 3685 AU | 8785 A | U85 APU | 9386 A | 9392 AU | 2786 A | 85786 A | 1180 A | 1198 ATR | 9386 A_NL | 9385 A |
| | Type | Ester | Ester | Ester | Ester | Ester | Ether | Ether | Ester | Ester | Ether | Ether | Ether | Ether |
| | Density [g/cm$^3$] | 1.2 | 1.2 | 1.2 | 1.2 | 1.2 | 1.1 | 1.1 | 1.2 | 1.1 | 1.1 | 1.1 | 1.1 | 1.1 |
| | Softening temperature (A) [° C.] | 145 | 156 | 135 | 164 | 162 | 150 | 161 | 110 | 128 | 127 | 175 | 145 | 140 |
| | MFR [g/10 min] (190° C., 10 kgf) | 1.8 | 0.7 | 5.5 | 1.2 | 17 | 26 | 19 | 238 | 598 | 43 | 0.8 | 30 | 2.4 |
| | Shore A hardness | 90 | 91 | 87 | 87 | 87 | 87 | 93 | 87 | 88 | 79 | 95 | 88 | 86 |

Preparation of Expanded Beads

Examples 1 to 6 and Comparative Examples 1 and 2

1 kg of the above-obtained resin beads and 3 liters of water as a dispersion medium were charged in a 5-liter pressure-resistant closed vessel equipped with a stirrer, and 0.3 parts by mass of kaolin as a dispersant and 0.004 parts by mass of a sodium alkylbenzenesulfonate as a surfactant were also added to 100 parts by mass of the resin beads.

The closed vessel was subjected to temperature rise to a predetermined impregnation temperature while stirring the inside of the closed vessel, and carbon dioxide as a blowing agent was fed under pressure into the closed vessel until reaching a predetermined pressure, followed by keeping at a predetermined expansion temperature for 15 minutes.

Thereafter, the expandable resin beads having the blowing agent impregnated therein were released from the closed vessel under atmospheric pressure together with the dispersion medium, while adjusting the pressure in the vessel with nitrogen in a fixed level, thereby obtaining expanded beads.

A maximum bead diameter of the expanded beads obtained in Example 1 was 3.5 mm, and a ratio of the maximum particle diameter to the minimum particle diameter was 1.1.

Example 7 to 10 and Comparative Examples 3 to 5

Expanded beads were prepared in the same manner as in Example 1, except for adding 0.2 parts by mass of tricalcium phosphate (TCP) as the dispersant. The obtained expanded beads (1 kg) were washed with 50 liters of nitric acid having a pH of 4 or less for 10 minutes to remove TCP on the surfaces of the expanded beads, and the expanded beads were then washed with 50 liters of pure water for 10 minutes to remove the nitric acid.

A maximum bead diameter of the expanded beads obtained in Example 7 was 3.5 mm, and a ratio of the maximum particle diameter to the minimum particle diameter was 1.1.

Comparative Example 6

Expanded beads were prepared using carbon dioxide as the blowing agent by the impregnation expansion method. Specifically, 1 kg of the resin beads were coated with 1 g of zinc stearate as a mutual adhesion preventing agent; the resulting resin beads were put into a pressure-resistant vessel; the vessel was hermetically sealed; and carbon dioxide was fed under pressure into the vessel until reaching a predetermined pressure, followed by keeping at 23° C. for 6 hours. Thereafter, the pressure in the vessel was depressurized to take out the expandable resin beads from the pressure-resistant vessel. The taken out expandable resin beads were immediately put into a pressurized expanding machine, and the temperature was raised to a predetermined temperature, followed by keeping for 20 seconds to obtain expanded beads.

The aforementioned production method is a method called as the gas impregnation pre-expansion method. In general, the gas impregnation pre-expansion method is a method in which a physical blowing agent is impregnated in resin beads under a high pressure to prepare expandable resin beads, and the expandable resin beads are then heated and expanded with water vapor or the like, to obtain expanded beads. In the expanded beads produced by the gas impregnation pre-expansion method, the expansion is performed at a relatively low temperature, and therefore, cells of the expanded beads are liable to become fine. In addition, in the gas impregnation pre-expansion method, a step of impregnating the blowing agent and a step of undergoing expansion must be performed separately. In consequence, it is necessary to expand the resin beads before the blowing agent impregnated in the resin beads is dissipated, and hence, it is hard to say that the gas impregnation pre-expansion method is excellent in productivity.

Comparative Example 7

Expanded beads were prepared in the same manner as in Example 1, except for using butane as the blowing agent.

The respective expanded beads obtained in the Examples and Comparative Examples were subjected to evaluations and measurements of various physical properties by the aforementioned methods. The physical properties of the respective expanded beads are shown in Table 2.

Observation photographs by a scanning electron microscope (SEM) of cross-sections of the expanded beads prepared in Examples 3 and 5 and Comparative Examples 1 to 3, 6, and 7, each of which is a representative among the above-prepared expanded beads, are shown in FIGS. 1 to 7.

Figure 6:
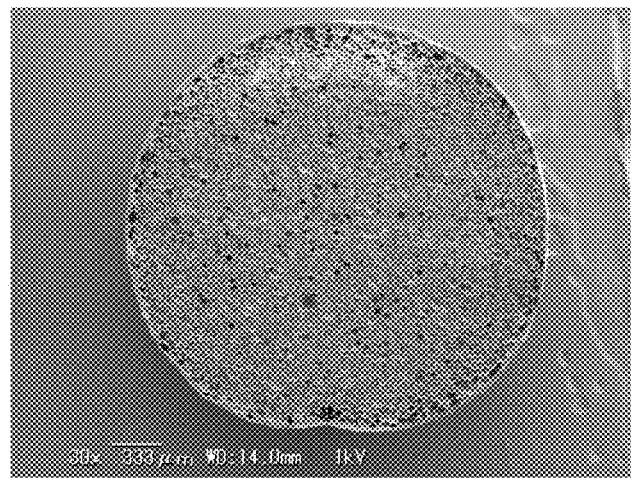
FIG. 6 is an SEM photograph of a cross section of expanded beads of Comparative Example 6.
Figure 7:
FIG. 7 is an SEM photograph of a cross section of expanded beads of Comparative Example 7.

As noted from the SEM photographs of FIGS. 1 to 7, it is understood that the expanded beads of Examples 3 and 5 (FIGS. 1 and 2) are larger in the cell diameter than the expanded beads of Comparative Examples 6 and 7 (FIGS. 6 and 7). Furthermore, it was perceived that the expanded beads of Examples 3 and 5 are expanded beads having uniform cells, in which closed cells are formed all over.

Meanwhile, in the expanded beads of Comparative Examples 1 to 3 (FIGS. 3 to 5), excessively large cells of 500 μm or more are formed in the interiors thereof, and therefore, it may not be said that the expanded beads of Comparative Examples 1 to 3 are good expanded beads.

In the expanded beads obtained by the gas impregnation pre-expansion method using carbon dioxide as the blowing agent (Comparative Example 6) and the expanded beads obtained by means of direction expansion using butane as the blowing agent (Comparative Example 7), the average cell diameter of the expanded beads was extremely small.

[Preparation of Expanded Beads Molded Article]

The respective expanded beads as prepared above were filled in a mold cavity of 200 mm in length×600 mm in width×33 mm in thickness and subjected to in-mold molding upon heating with steam at a predetermined molding pressure. Then, the resultant was cooled to ambient temperature, and the molded article was taken out from the mold, thereby obtaining an expanded beads molded article in the form of a plank.

The physical properties of each of the resulting expanded beads molded articles are also shown in combination in Table 2.

TABLE 2

| | | Example | | | | | | | | | |
|---|---|---|---|---|---|---|---|---|---|---|---|
| | | 1 | 2 | 3 | 4 | 5 | 6 | 7 | 8 | 9 | 10 |
| Production conditions | Raw material resin | 1 | 2 | 2 | 3 | 4 | 5 | 6 | 7 | 13 | 13 |
| | Impregnation temperature [° C.] | 134 | 132 | 135 | 120 | 141 | 135 | 134 | 149 | 129 | 132 |
| | Difference between softening temperature of raw material resin and impregnation temperature [° C.] | 11 | 24 | 21 | 15 | 23 | 27 | 16 | 12 | 11 | 8 |
| | Impregnation pressure [MPa(G)] | 4.0 | 4.0 | 4.0 | 4.0 | 4.0 | 4.0 | 3.5 | 4.0 | 3.5 | 3.5 |
| | Expansion temperature (° C.) | 134 | 132 | 135 | 120 | 141 | 135 | 134 | 149 | 129 | 132 |

TABLE 2-continued

| | | 1 | 2 | 3 | 4 | 5 | 6 | 7 | 8 | 9 | 10 |
|---|---|---|---|---|---|---|---|---|---|---|---|
| Expanded beads | Apparent density [g/cm³] | 0.17 | 0.17 | 0.13 | 0.17 | 0.18 | 0.17 | 0.17 | 0.17 | 0.18 | 0.13 |
| | Average cell diameter [μm] | 175 | 175 | 165 | 200 | 150 | 74 | 205 | 150 | 110 | 120 |
| | Average cell diameter of central part [μm] | 185 | 190 | 180 | 220 | 145 | 100 | 165 | 210 | 120 | 130 |
| | Average cell diameter of surface layer part [μm] | 170 | 170 | 160 | 190 | 155 | 65 | 140 | 200 | 100 | 105 |
| | Average cell diameter ratio (central part/surface layer part) | 1.1 | 1.1 | 1.1 | 1.2 | 0.9 | 1.5 | 1.2 | 1.1 | 1.1 | 1.2 |
| | MFR (190° C., 10 kgf) [g/10 min] | 30 | 17 | 18 | 29 | 18 | 33 | 42 | 39 | 14 | 17 |
| | Softening temperature [° C.] | 140 | 153 | 153 | 115 | 144 | 137 | 150 | 159 | 140 | 140 |
| | Shore A hardness | 90 | 91 | 91 | 87 | 87 | 87 | 87 | 93 | 86 | 86 |
| | Closed cell ratio (C) [%] | 80 | 77 | 85 | 77 | 80 | 87 | 85 | 81 | 85 | 85 |
| | Closed cell ratio (D) [%] | 77 | 74 | 82 | 74 | 77 | 84 | 82 | 78 | 80 | 80 |
| Expanded beads molded article | Molding pressure [MPa(G)] | 0.28 | 0.28 | 0.18 | 0.10 | 0.24 | 0.34 | 0.08 | 0.12 | 0.18 | 0.15 |
| | Degree of fusion bonding [%] | 100 | 100 | 100 | 100 | 100 | 100 | 100 | 100 | 100 | 100 |
| | Density [g/cm³] | 0.23 | 0.21 | 0.17 | 0.21 | 0.23 | 0.24 | 0.22 | 0.20 | 0.22 | 0.18 |
| | Shrinkage factor [%] | 2.8 | 2.8 | 2.5 | 4.3 | 4.3 | 5.8 | 3.0 | 2.5 | 4.0 | 3.5 |
| | Compression stress (at the time of 50% strain) [kPa] | 280 | 270 | 220 | 250 | 246 | 240 | 250 | 221 | 230 | 210 |
| | Compression set (23° C., 22 h) [%] | 1.5 | 1.8 | 1.5 | 1.8 | 2.4 | 1.8 | 1.8 | 1.6 | 1.8 | 1.8 |
| | Modulus of repulsion elasticity [%] | 48 | 48 | 50 | 56 | 64 | 68 | 63 | 47 | 63 | 63 |

| | | Comparative Example | | | | | | |
|---|---|---|---|---|---|---|---|---|
| | | 1 | 2 | 3 | 4 | 5 | 6 | 7 |
| Production conditions | Raw material resin | 8 | 9 | 10 | 11 | 12 | 2 | 2 |
| | Impregnation temperature [° C.] | 99 | 116 | 115 | 161 | 132 | 23 | 130 |
| | Difference between softening temperature of raw material resin and impregnation temperature [° C.] | 11 | 12 | 12 | 14 | 13 | 133 | 26 |
| | Impregnation pressure [MPa(G)] | 4.0 | 4.0 | 4.0 | 4.0 | 4.0 | 4.0 | 3.2 |
| | Expansion temperature (° C.) | 99 | 116 | 115 | 161 | 132 | 115 | 130 |
| Expanded beads | Apparent density [g/cm³] | 0.37 | 0.13 | 0.21 | 0.14 | 0.20 | 0.18 | 0.15 |
| | Average cell diameter [μm] | 150 | 213 | 180 | 110 | 250 | 40 | 8 |
| | Average cell diameter of central part [μm] | 350 | 1400 | 330 | 105 | 250 | 30 | 20 |
| | Average cell diameter of surface layer part [μm] | 60 | 90 | 160 | 120 | 250 | 45 | 5 |
| | Average cell diameter ratio (central part/surface layer part) | 5.8 | 15.6 | 2.1 | 0.9 | 1.0 | 0.7 | 4.0 |
| | MFR (190° C., 10 kgf) [g/10 min] | >600 | >600 | 78 | 67 | 84 | 30 | 37 |
| | Softening temperature [° C.] | 102 | 123 | 114 | 165 | 128 | 131 | 133 |
| | Shore A hardness | 87 | 88 | 79 | 95 | 88 | 91 | 91 |
| | Closed cell ratio (C) [%] | 84 | 75 | 76 | 8 | 55 | 88 | 89 |
| | Closed cell ratio (D) [%] | 58 | 38 | 30 | 7 | 25 | 85 | 86 |
| Expanded beads molded article | Molding pressure [MPa(G)] | 0.10 | 0.10 | 0.10 | 0.14 | 0.14 | 0.28 | 0.30 |
| | Degree of fusion bonding [%] | 0 | 0 | 20 | 0 | 0 | 100 | 100 |
| | Density [g/cm³] | — | — | 0.27 | 0.23 | 0.37 | 0.22 | 0.22 |
| | Shrinkage factor [%] | — | — | 4.0 | 10.0 | 4.8 | 4.0 | 6.0 |
| | Compression stress (at the time of 50% strain) [kPa] | — | — | — | — | — | 310 | 320 |
| | Compression set (23° C., 22 h) [%] | — | — | — | — | — | 3.2 | 5.6 |
| | Modulus of repulsion elasticity [%] | — | — | — | — | — | 42 | 40 |

As noted from the evaluation results shown in Table 2, all of the expanded beads of Examples 1 to 10 had an average cell diameter of 50 to 300 μm and a Shore A hardness of 85 or more and were expanded beads where excessively large cells were not existent. In addition, the shrinkage factor of the expanded beads molded article obtained through in-mold molding of such expanded beads is low. In consequence, the expanded beads had excellent moldability. Furthermore, it was perceived that all of the aforementioned expanded beads molded articles are excellent in physical properties, such as compression set, modulus of repulsion elasticity, etc.

In addition, it may be said that in the case of using an ether-based TPU raw material resin (Examples 7 to 10), it is able to make the molding pressure at the time of molding low as compared with the case of using an ester-based TPU raw material resin having a softening temperature of the same degree (Examples 1 to 3, 5, and 6).

Meanwhile, in the expanded beads of Comparative Examples 1 to 3, the cavity portion is formed in the interior thereof, and the scattering of the cell diameter is large. In addition, when molding the expanded beads, the expanded beads caused foam-breaking and shrinkage, and therefore, a good expanded beads molded article was not obtained. On the occasion of molding the expanded beads of Comparative Examples 4 and 5, though the shape as a molded article was kept, a good expanded beads molded article was not obtained.

In addition, the expanded beads of Comparative Examples 6 and 7 were extremely small in the average cell diameter. In addition, the compression set of the expanded beads molded article obtained through in-mold molding of such expanded beads was high, and the modulus of repulsion elasticity of the expanded beads molded article was low. When the expanded beads of Comparative Examples 6 and 7 were molded at a low molding pressure, the degree of fusion bonding of the resulting expanded beads molded articles was lowered, so that it was difficult to obtain a good expanded beads molded article.

The invention claimed is:

1. Expanded beads of thermoplastic polyurethane, wherein a Shore A hardness of the thermoplastic polyurethane is 85 or more and 95 or less; an average cell diameter of the expanded beads on a cut surface when bisecting the expanded bead is from 50 to 300 μm; and a closed cell ratio (D) when bisecting the expanded bead is 60% or more, wherein a ratio (A/B) of the average cell diameter (A) in a central part of the expanded bead to an average cell diameter (B) in a surface layer part of the expanded bead is from 0.5 to 2, wherein the central part is one internal portion of a trisected line segment on the cut surface, and the surface layer part is two external portions of the trisected line segment on the cut surface.

2. The expanded beads of thermoplastic polyurethane according to claim 1, wherein a melt flow rate at 190° C. under a load of 10 kg of the thermoplastic polyurethane is 60 g/10 min or less.

3. The expanded beads of thermoplastic polyurethane according to claim 1, wherein a softening temperature of the thermoplastic polyurethane is from 110 to 160° C.

4. The expanded beads of thermoplastic polyurethane according to claim 1, wherein an apparent density of the expanded beads is 0.3 g/cm$^3$ or less.

5. An expanded thermoplastic polyurethane beads molded article obtained through in-mold molding of the expanded beads of thermoplastic polyurethane according to claim 1.

6. The expanded beads of thermoplastic polyurethane according to claim 1, wherein the average cell diameter (A) in the central part of the expanded bead is 250 μm or less.

7. The expanded beads of thermoplastic polyurethane according to claim 1, wherein the ratio (A/B) of the average cell diameter (A) in the central part of the expanded bead to an average cell diameter (B) in the surface layer part of the expanded bead is from 1 to 1.6.

8. The expanded beads of thermoplastic polyurethane according to claim 4, wherein the apparent density of the expanded beads is 0.02 g/cm$^3$ to 0.2 g/cm$^3$.

9. The expanded beads of thermoplastic polyurethane according to claim 1, wherein the closed cell ratio (D) when bisecting the expanded bead is 70% or more.

* * * * *